United States Patent
Hosoi et al.

(10) Patent No.: US 9,787,957 B2
(45) Date of Patent: Oct. 10, 2017

(54) IMAGE PROJECTION APPARATUS, IMAGE PROJECTION METHOD, AND COMPUTER-READABLE STORAGE MEDIUM

(71) Applicants: Nobuhiro Hosoi, Kanagawa (JP); Takahiro Kado, Kanagawa (JP)

(72) Inventors: Nobuhiro Hosoi, Kanagawa (JP); Takahiro Kado, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 106 days.

(21) Appl. No.: 14/855,756

(22) Filed: Sep. 16, 2015

(65) Prior Publication Data
US 2016/0100141 A1    Apr. 7, 2016

(30) Foreign Application Priority Data

Oct. 7, 2014   (JP) .................................. 2014-206778

(51) Int. Cl.
*H04N 9/31* (2006.01)
*G02B 26/00* (2006.01)
(Continued)

(52) U.S. Cl.
CPC .......... *H04N 9/3155* (2013.01); *G02B 26/008* (2013.01); *G03B 21/2026* (2013.01);
(Continued)

(58) Field of Classification Search
CPC ........ G02B 26/00; G03B 21/20; G03B 21/14; G03B 21/00; H04N 9/31; H04N 5/74; G09G 3/34
See application file for complete search history.

(56) References Cited

U.S. PATENT DOCUMENTS 5,706,061 A * 1/1998 Marshall .............. H04N 9/3114
                                                    348/742
8,894,220 B2   11/2014 Tsukagoshi
(Continued)

FOREIGN PATENT DOCUMENTS

CN    1843064 A    10/2006
CN    101071259 A   11/2007
(Continued)

OTHER PUBLICATIONS

Partial European Search Report issued Mar. 9, 2016 in Patent Application No. 15184547.6.
(Continued)

*Primary Examiner* — Sultan Chowdhury
*Assistant Examiner* — Danell L Owens
(74) *Attorney, Agent, or Firm* — Oblon, McClelland, Maier & Neustadt, L.L.P.

(57) ABSTRACT

An image projection apparatus includes a light source configured to emit light with a luminance according to electric power; a color wheel configured to sequentially transmit the light through multiple color filters arranged along a circumferential direction; a light modulation element configured to form an image by modulating an intensity of the light transmitted through the color wheel according to an input signal representing input image data; and a selection controller configured to select, out of a first waveform indicating temporal change in electric power supplied to the light source in a first mode and a second waveform indicating temporal change in electric power supplied to the light source in a second mode, the second waveform when a luminance value of the input signal is equal to or less than a first threshold. A brightness of the image in the second mode is lower than that in the first mode.

18 Claims, 7 Drawing Sheets

(51) Int. Cl.
*G03B 21/20* (2006.01)
*G03B 33/08* (2006.01)

(52) U.S. Cl.
CPC ......... *G03B 21/2053* (2013.01); *G03B 33/08* (2013.01); *H04N 9/3111* (2013.01); *H04N 9/3114* (2013.01); *H04N 9/3158* (2013.01)

(56) References Cited

U.S. PATENT DOCUMENTS

| | | | |
|---|---|---|---|
| 2008/0136977 A1 | 6/2008 | Harada et al. | |
| 2011/0019164 A1 | 1/2011 | Wu et al. | |
| 2011/0254870 A1 | 10/2011 | Wang | |
| 2014/0111777 A1 | 4/2014 | Miyata | |
| 2014/0176918 A1* | 6/2014 | Ozawa | G03B 21/2053 353/85 |
| 2014/0198261 A1* | 7/2014 | Yamaguchi | H04N 9/3114 348/744 |

FOREIGN PATENT DOCUMENTS

| | | |
|---|---|---|
| CN | 102203669 A | 9/2011 |
| CN | 103293838 A | 9/2013 |
| CN | 103777444 A | 5/2014 |
| JP | H06-110131 | 4/1994 |
| JP | 2011-227487 | 11/2011 |
| JP | 5213080 B2 | 6/2013 |
| JP | 5494415 | 3/2014 |
| TW | 201104338 A | 2/2011 |

OTHER PUBLICATIONS

Extended European Search Report issued on Jun. 15, 2016 in European Patent Application No. 15184547.6.

Combined Office Action and Search Report issued Jan. 19, 2017 in Chinese Patent Application No. 201510775996.8 (with English translation).

* cited by examiner

LAMP WAVEFORM FOR HIGH BRIGHTNESS MODE

FIG.7

LAMP WAVEFORM FOR HUE PRIORITY MODE

FIG.8

LAMP WAVEFORM FOR LOW
BRIGHTNESS MODE

| | CYAN | WHITE | RED | YELLOW | GREEN | BLUE | INDIGO |
|---|---|---|---|---|---|---|---|
| ANGLE OF EACH SEGMENT | 40 | 90 | 60 | 30 | 60 | 60 | 20 |
| CURRENT AMPLITUDE RATIO CORRESPONDING TO EACH SEGMENT OF LAMP WAVEFORM FOR HUE PRIORITY MODE | 84 | 84 | 130 | 90 | 83 | 120 | 120 |
| CURRENT AMPLITUDE RATIO CORRESPONDING TO EACH SEGMENT OF LAMP WAVEFORM FOR LOW BRIGHTNESS MODE | 60 | 60 | 160 | 73 | 80 | 150 (40°) | 140 (20°) | 140 |

IMAGE PROJECTION APPARATUS, IMAGE PROJECTION METHOD, AND COMPUTER-READABLE STORAGE MEDIUM

CROSS-REFERENCE TO RELATED APPLICATION

The present application claims priority to and incorporates by reference the entire contents of Japanese Patent Application No. 2014-206778 filed in Japan on Oct. 7, 2014.

BACKGROUND OF THE INVENTION

1. Field of the Invention

The present invention relates to an image projection apparatus, an image projection method, and a computer-readable storage medium.

2. Description of the Related Art

Conventionally, in DLP™ projectors, in order to change the brightness or hue with respect to each image mode, there is used a technique to change a waveform (a lamp waveform) indicating temporal change in electric power supplied to a light source, which emits a light with a luminance according to supplied electric power, in order to change the brightness or hue with respect to each mode.

For example, Japanese Patent No. 5494415 has disclosed a technology to change to a highest-contrast lamp waveform at the time of focus adjustment for ease of the focus adjustment. The contrast of a projector is defined as the ratio between brightness in the full-screen white projection and brightness in the full-screen black projection.

However, in conventional technologies, the same lamp waveform is output both in the full-screen white projection and in the full-screen black projection; therefore, there is a problem that it is not possible to obtain sufficient contrast.

SUMMARY OF THE INVENTION

It is an object of the present invention to at least partially solve the problems in the conventional technology.

According to an embodiment, there is provided an image projection apparatus that includes a light source configured to emit light with a luminance according to supplied electric power; a color wheel configured to sequentially transmit the light from the light source through multiple color filters arranged along a circumferential direction; a light modulation element configured to form an image by modulating an intensity of the light transmitted through the color wheel according to an input signal representing input image data; and a selection controller configured to select, out of a first lamp waveform indicating temporal change in electric power supplied to the light source in a first mode and a second lamp waveform indicating temporal change in electric power supplied to the light source in a second mode, the second lamp waveform when a luminance value of the input signal is equal to or less than a first threshold. A brightness of the image in the second mode is lower than that in the first mode.

According to another embodiment, there is provided an image projection method implemented by an image projection apparatus that includes a light source configured to emit light with a luminance according to supplied electric power, a color wheel configured to sequentially transmit the light from the light source through multiple color filters arranged along a circumferential direction, and a light modulation element configured to form an image by modulating an intensity of the light transmitted through the color wheel according to an input signal representing input image data. The method includes selecting, out of a first lamp waveform indicating temporal change in electric power supplied to the light source in a first mode and a second lamp waveform indicating temporal change in electric power supplied to the light source in a second mode, the second lamp waveform when a luminance value of the input signal is equal to or less than a first threshold, a brightness of the image in the second mode being lower than that in the first mode.

According to still another embodiment, there is provided a non-transitory computer-readable storage medium with an executable program stored thereon and executed by a computer of an image projection apparatus that includes a light source configured to emit light with a luminance according to supplied electric power, a color wheel configured to sequentially transmit the light from the light source through multiple color filters arranged along a circumferential direction, and a light modulation element configured to form an image by modulating an intensity of the light transmitted through the color wheel according to an input signal representing input image data. The program instructs the computer to perform selecting, out of a first lamp waveform indicating temporal change in electric power supplied to the light source in a first mode and a second lamp waveform indicating temporal change in electric power supplied to the light source in a second mode, the second lamp waveform when a luminance value of the input signal is equal to or less than a first threshold, a brightness of the image in the second mode being lower than that in the first mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
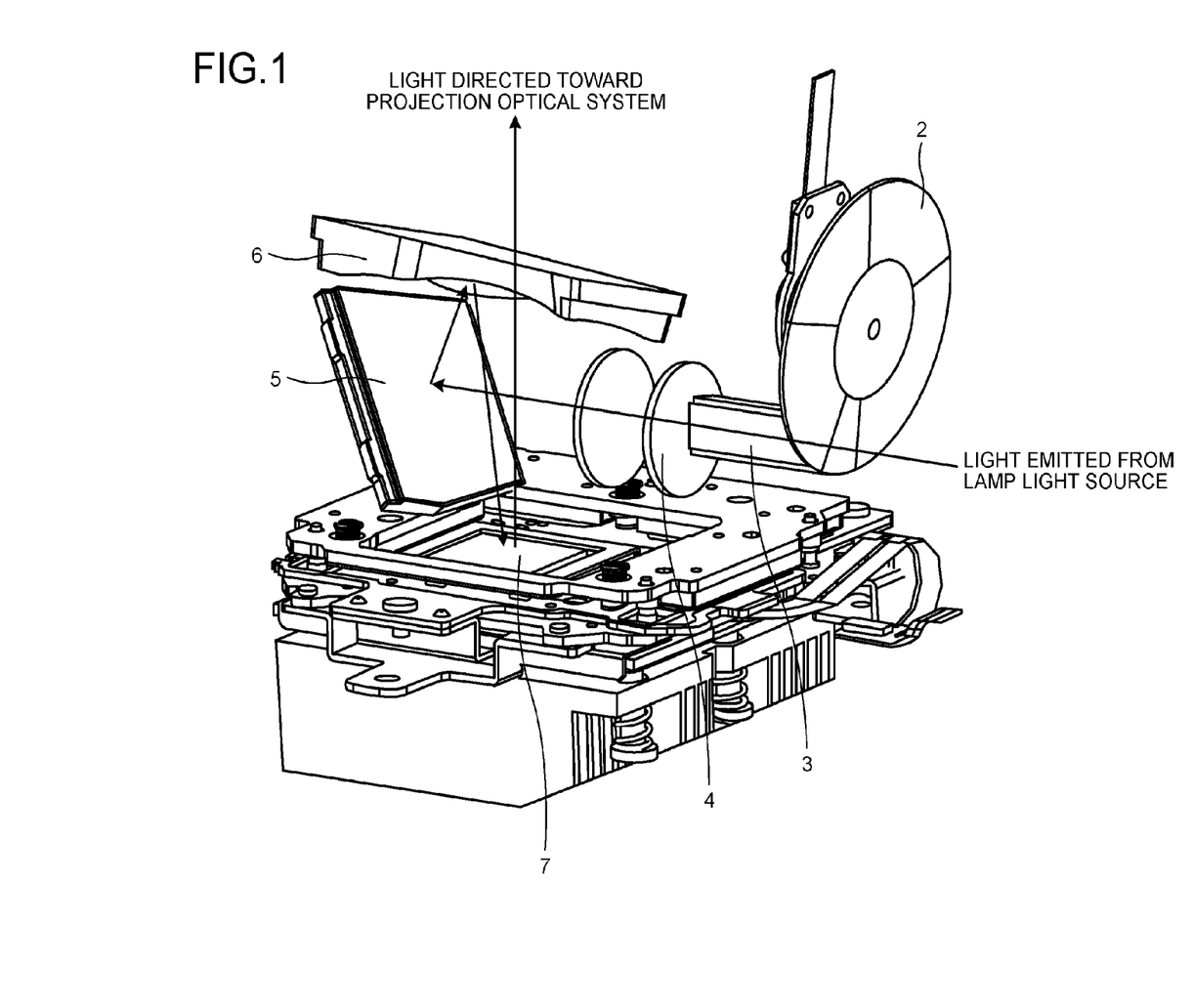
FIG. 1 is a perspective view of a projector according to an embodiment.

An exemplary embodiment of an image projection apparatus, image projection method, and program according to the present invention will be explained in detail below with reference to accompanying drawings FIG. 1 illustrates an example of an entire configuration of a projector (a color sequential type projector) 1 as an image projection apparatus according to the present invention. As illustrated in FIG. 1, a light emitted from a lamp light source first enters a color wheel 2.

Figure 2:
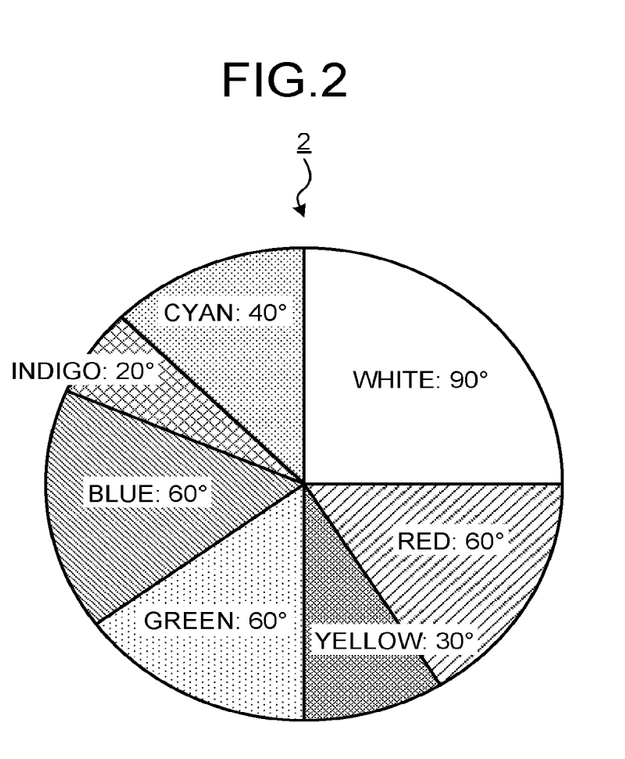
FIG. 2 illustrates an example of a color wheel.

FIG. 2 illustrates an example of the color wheel 2 according to the embodiment. The color wheel 2 sequentially transmits a light from the lamp light source through multiple color filters (hereinafter, may be referred to as "segment(s)") arranged along a circumferential direction. That is, the color wheel 2 converts a white light from the lamp light source into multiple color lights and outputs the converted lights in a time-division manner. In the example of FIG. 2, the color wheel 2 includes a cyan color filter for converting a white light from the lamp light source into a cyan color light, a white (transparent) color filter which just lets the white light therethrough, a red color filter for converting the white light into a red color light, a yellow color filter for converting the white light into a yellow color light, a green color filter for converting the white light into a green color light, a blue color filter for converting the white light into a blue color light, and an indigo color filter for converting the white light into an indigo color light.

Incidentally, the shape of each color filter is a circular sector, and the central angle of each is set at a predetermined value. In the example of FIG. 2, a central angle of the cyan color filter is set at 40 degrees, a central angle of the white color filter is set at 90 degrees, a central angle of the red color filter is set at 60 degrees, a central angle of the yellow color filter is set at 30 degrees, a central angle of the green color filter is set at 60 degrees, a central angle of the blue color filter is set at 60 degrees, and a central angle of the indigo color filter is set at 20 degrees; however, the central angles of the color filters are not limited to these.

To return to FIG. 1, continue with the explanation. The light exiting from the color wheel 2 passes through a light tunnel 3, and enters a light modulation element 7 via a relay lens 4 and multiple mirrors such as a cylindrical mirror 5 and a concave mirror 6. The part from the color wheel 2 to the concave mirror 6 may be referred to as an illumination optical system.

In the present embodiment, the light modulation element 7 is composed of a digital mirror device (DMD) that has a rectangular mirror surface composed of a plurality of micromirrors and the micromirrors are driven in a time-division manner according to an input signal representing input image data thereby processing and reflecting an incident light so as to form a specified image; however, the light modulation element 7 is not limited to this. In short, the light modulation element 7 can be anything as long as it has a function of forming an image by modulating the intensity of a light transmitted through the color wheel 2 according to an input signal. The DMD switches on/off each micromirror according to an input signal, thereby selecting a light to be supplied to a projection optical system. The light supplied to the projection optical system goes through multiple projection lenses (not illustrated) thereby being expanded, and is projected onto a projection surface such as a screen. One color image is generated by superimposing different color images projected in a time-division manner on top of another.

Figure 3:
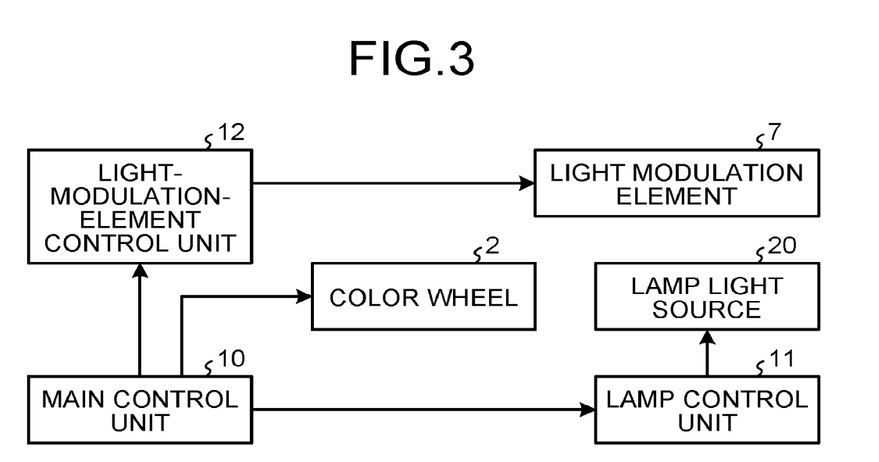
FIG. 3 illustrates an example of a hardware configuration of the projector.

FIG. 3 illustrates an example of a hardware configuration of the projector 1 according to the present embodiment. For convenience of explanation, minimum components required to realize the present invention are illustrated in FIG. 3; however, components of the projector 1 are not limited to these. As illustrated in FIG. 3, the projector 1 includes a main control unit 10, a lamp control unit 11, a light-modulation-element control unit 12, a lamp light source 20, the color wheel 2, and the light modulation element 7.

The main control unit 10 controls the operation of the projector 1 overall. In this example, the main control unit 10 sends synchronization signals to the color wheel 2, the lamp control unit 11, and the light-modulation-element control unit 12 and drives them in synchronization, thereby generating different color images in a time-division manner. Specific nature of the main control unit 10 will be described later.

Under the control of the main control unit 10, the light-modulation-element control unit 12 controls and causes the light modulation element 7 to modulate the intensity of a light transmitted through the color wheel 2 according to an input signal to form an image.

Figure 4:
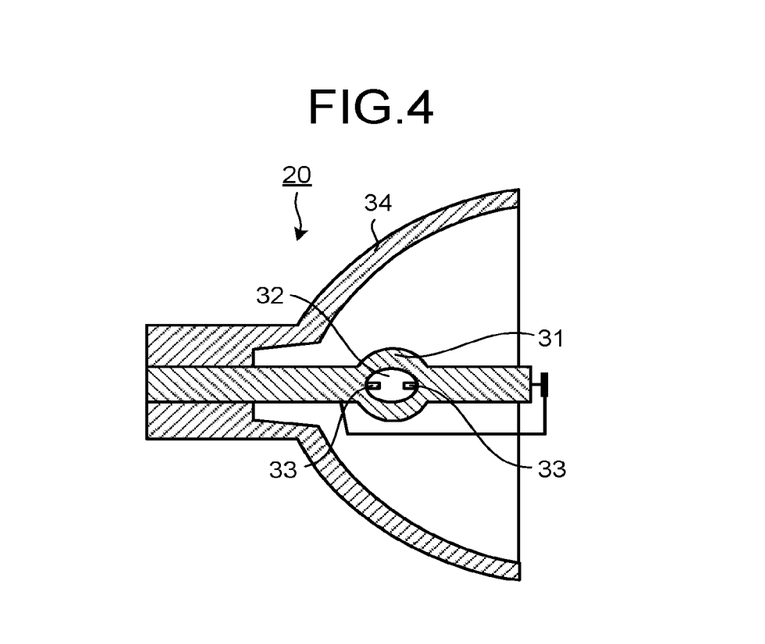
FIG. 4 illustrates an example of a configuration of a lamp light source.

The lamp light source 20 emits a light with a luminance according to supplied electric power. More specifically, as illustrated in FIG. 4, the lamp light source 20 includes a vacuum tube part 31, mercury 32 enclosed in the vacuum tube part 31 under high pressure, a pair of electrodes 33 installed in the vacuum tube part 31, and a reflector 34. The mercury 32 emits light by discharge of the pair of electrodes 33, thereby the lamp light source 20 works as a light source. In this example, the lamp light source 20 may be referred to a light source. Furthermore, in this example, the lamp light source 20 is driven by alternating square waves, and output of the alternating square waves is controlled by the lamp control unit 11.

To return to FIG. 3, continue with the explanation. Under the control of the main control unit 10, the lamp control unit 11 controls the electric power supplied to the lamp light source 20. In this example, with respect to each of several types of modes according to the image quality (brightness, contrast, etc.) of a projected color image (a color image formed by the light modulation element 7), the lamp control unit 11 records a lamp waveform indicating temporal change in electric power supplied to the lamp light source 20. In this example, high brightness mode in which the brightness of a color image is at a maximum, hue priority mode in which emphasis is put on the hue of a color image, and low brightness mode in which the brightness of a color image is at a minimum are provided as the several types of modes; the lamp control unit 11 records respective lamp waveforms corresponding to these modes. Although more specific nature of the lamp control unit 11 will be described later, yet under the control of the main control unit 10, the lamp control unit 11 selects any of the lamp waveforms and controls the electric power supplied to the lamp light source 20 in accordance with the selected lamp waveform.

Figure 5:
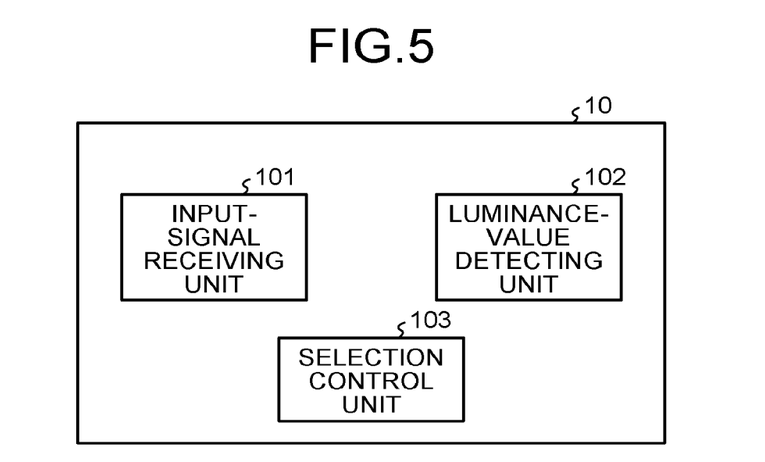
FIG. 5 illustrates an example of a functional configuration of a main control unit.

Subsequently, specific nature of the main control unit 10 is explained. FIG. 5 illustrates an example of a functional configuration of the main control unit 10. As illustrated in FIG. 5, the main control unit 10 includes an input-signal receiving unit 101, a luminance-value detecting unit 102, and a selection control unit 103. For convenience of explanation, only functions related to the present invention are illustrated in FIG. 5; however, functions that the main control unit 10 has are not limited to these. Incidentally, in this example, the main control unit 10 has a hardware configuration including a CPU, a storage device for storing therein a program, etc., and the functions (the input-signal receiving unit 101, the luminance-value detecting unit 102, and the selection control unit 103) of the main control unit 10 are realized by the CPU executing the program. However, not only that, for example, at least some of the functions of the main control unit 10 can be realized a dedicated hardware circuit (for example, a semiconductor integrated circuit or the like).

The input-signal receiving unit 101 receives an input signal from the outside. The luminance-value detecting unit 102 detects a luminance value of the input signal received by the input-signal receiving unit 101. For example, the luminance-value detecting unit 102 can break the input signal received by the input-signal receiving unit 101 down into multiple sets of different color image data corresponding one-to-one to the multiple color filters included in the color wheel 2 illustrated in FIG. 2 and detect a luminance value with respect to each of pixels included in each of the sets of different color image data (the minimum unit of color information). As a method for detecting a luminance value, various well-known technologies can be used.

When the luminance value of the input signal is equal to or less than a first threshold, the selection control unit 103 performs control of selecting a second lamp waveform out of a first lamp waveform indicating temporal change in electric power supplied to the lamp light source 20 in a first mode and the second lamp waveform indicating temporal change in electric power supplied to the lamp light source 20 in a second mode in which the brightness of an image (a projected color image) is lower than that in the first mode. On the other hand, when the luminance value of the input signal exceeds the first threshold, the selection control unit 103 performs control of selecting the first lamp waveform. The above-mentioned first threshold can be, for example, 5% of an allowable maximum luminance value. In the present embodiment, when an input signal is black-color image data (more specifically, image data of full-screen black), the selection control unit 103 performs control of selecting the second lamp waveform. Furthermore, when an input signal is not black-color image data (i.e., when a luminance value of an input signal exceeds the first threshold), the selection control unit 103 performs control of selecting the first lamp waveform.

As described above, in the present embodiment, the lamp control unit 11 records a lamp waveform for high brightness mode, a lamp waveform for hue priority mode, and a lamp waveform for low brightness mode. The high brightness mode or the hue priority mode may be referred to as a first mode. The lamp waveform for high brightness mode or the lamp waveform for hue priority mode may be referred to as a first lamp waveform. The first lamp waveform can be also considered to be information indicating a set value of electric power supplied to the lamp light source 20 with respect to each period of irradiation of the multiple color filters included in the color wheel 2 with a light from the lamp light source 20 in the first mode. Incidentally, it can be configured to provide only either one of the high brightness mode and the hue priority mode, or it can be configured to further provide one or more modes in which the brightness of an image is higher than that in the low brightness mode besides the high brightness mode and the hue priority mode.

Furthermore, the low brightness mode may be referred to as a second mode; and the lamp waveform for low brightness mode may be referred to as a second lamp waveform. The second lamp waveform can be also considered to be information indicating a set value of electric power supplied to the lamp light source 20 with respect to each period of irradiation of the multiple color filters included in the color wheel 2 with a light from the lamp light source 20 in the second mode in which the brightness of an image is lower than that in the first mode.

In the present embodiment, when an input signal is black-color image data, the selection control unit 103 instructs the lamp control unit 11 to select the lamp waveform for low brightness mode (the second lamp waveform) (from the other perspective, instructs to select the low brightness mode). When having received this instruction, the lamp control unit 11 selects the lamp waveform for low brightness mode, and controls the electric power supplied to the lamp light source 20 in accordance with the lamp waveform for low brightness mode. Furthermore, in the present embodiment, when an input signal is not black-color image data, the selection control unit 103 instructs the lamp control unit 11 to select the lamp waveform for high brightness mode or the lamp waveform for hue priority mode (the first lamp waveform) (from the other perspective, instructs to select the high brightness mode or the hue priority mode). For example, when either the high brightness mode or the hue priority mode has been specified (selected) by a user in advance, the selection control unit 103 instructs the lamp control unit 11 to select a lamp waveform for the specified mode. When having received this instruction, the lamp control unit 11 selects the lamp waveform for high brightness mode or the lamp waveform for hue priority mode in accordance with the instruction, and controls the electric power supplied to the lamp light source 20 in accordance with the selected lamp waveform.

In the present embodiment, the lamp control unit 11 can be considered to control the electric power supplied to the lamp light source 20 in accordance with a lamp waveform selected by the selection control unit 103 (the first lamp waveform or the second lamp waveform). In this example, the lamp control unit 11 may be referred to as a light-source controller.

Figure 6:
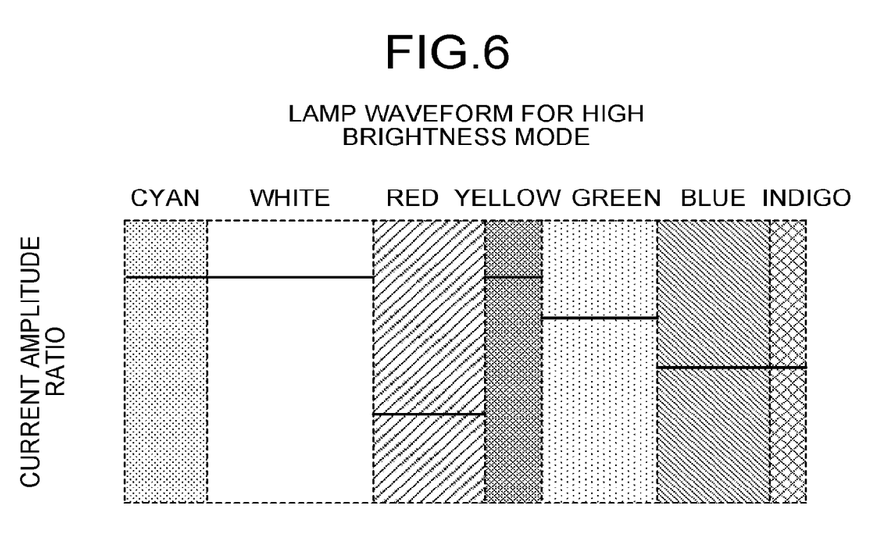
FIG. 6 illustrates an example of a lamp waveform for high brightness mode.
Figure 7:
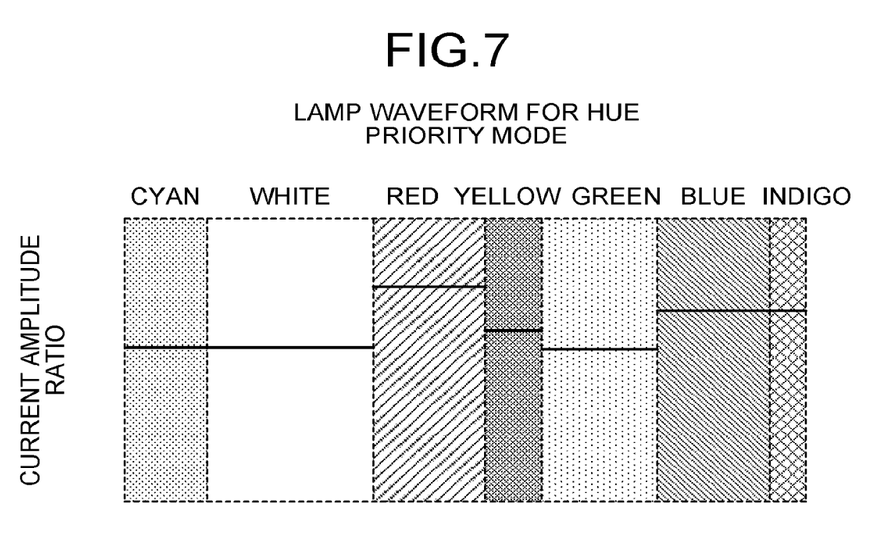
FIG. 7 illustrates an example of a lamp waveform for hue priority mode.
Figure 8:
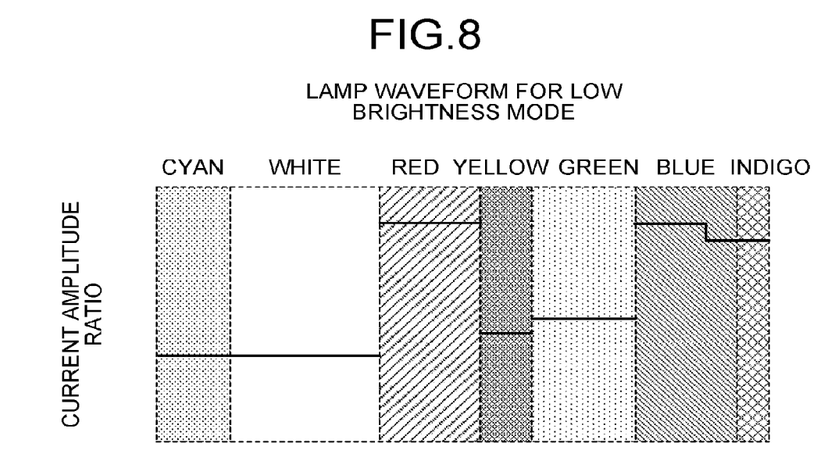
FIG. 8 illustrates an example of a lamp waveform for low brightness mode.

FIG. 6 illustrates one cycle of the lamp waveform for high brightness mode; FIG. 7 illustrates one cycle of the lamp waveform for hue priority mode; and FIG. 8 illustrates one cycle of the lamp waveform for low brightness mode. The lamp waveform shows a value (a set value) of electric power supplied to the lamp light source 20 with respect to each period of irradiation of the segments (the color filters) corresponding to colors of the color wheel 2 with a light from the lamp light source 20 (in examples of FIGS. 6 to 8, shows a set value of current amplitude ratio). By switching the lamp waveform to another, the balance of color brightness can be changed. In general, one current amplitude ratio is set with respect to each period of irradiation of the respective segments corresponding to the colors with a light from the lamp light source 20; however, not only that, for example, multiple current amplitude ratios can be set with respect to a period of irradiation of one segment with a light from the lamp light source 20. Incidentally, power (electric energy) for one cycle of the lamp waveform has been fixed, so the average current amplitude ratio is 100%.

Figure 9:
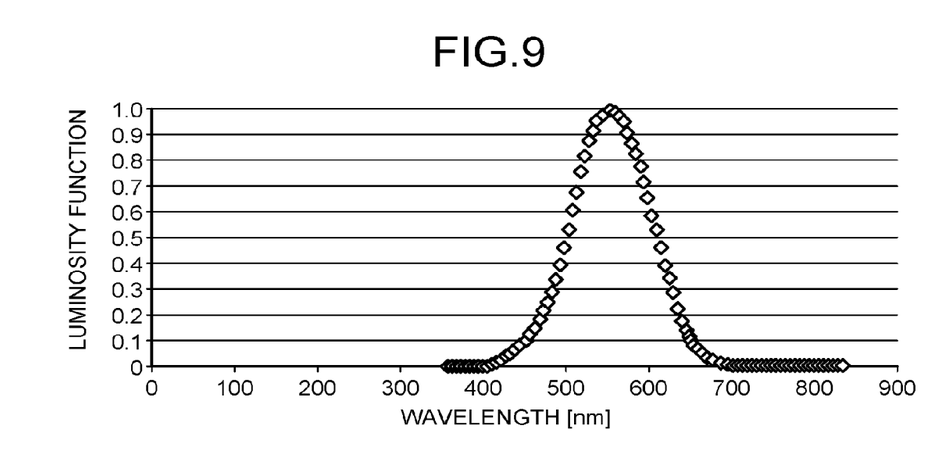
FIG. 9 illustrates a photopic luminosity function.

FIG. 9 is a diagram for explaining a photopic luminosity function. The luminosity function represents the sensitivity of the human eye to brightness of each wavelength at the same light energy. The peak sensitivity is at a wavelength of 555 nm in a bright place, and a luminosity function is the ratio to this maximum sensitivity. In red and blue wavelengths displaced from the peak, it feels dark to the human eye; in green wavelengths including the peak, it feels bright to the human eye. That is, light which has passed through the red and blue segments of the color wheel 2 feels dark to the human eye; light which has passed through the white, green, cyan, and yellow segments feels bright to the human eye. Therefore, if the current amplitude ratios corresponding to the red and blue segments are increased, and the current amplitude ratios corresponding to the white, green, cyan, and yellow segments are decreased, then the overall brightness of a color image becomes low (dark).

Here, the contrast of the projector 1 is defined as the ratio of brightness in the full-screen white projection and brightness in the full-screen black projection. In the present embodiment, switching to a lamp waveform that lowers the brightness of a projected color image (the second lamp waveform) in the full-screen black projection is one of the features. Accordingly, it is possible to improve the contrast.

In the present embodiment, the second lamp waveform (in this example, the lamp waveform for low brightness mode) is set so that a value of electric power supplied to the lamp light source 20 in a period of irradiation of at least either one of the color filter corresponding to red color and the color filter corresponding to blue color with a light from the lamp light source 20 becomes a larger value than that in the first lamp waveform (in this example, the lamp waveform for high brightness mode or the lamp waveform for hue priority mode). More specifically, the second lamp waveform is set so that a value of electric power supplied to the lamp light source 20 in a period of irradiation of a color filter with a transmittance of 5% or less for a wavelength of 555 nm with a light from the lamp light source 20 becomes a larger value than that in the first lamp waveform. Furthermore, the second lamp waveform is set so that a value of electric power supplied to the lamp light source 20 in a period of irradiation of a color filter with a transmittance of 90% or more for a wavelength of 555 nm with a light from the lamp light source 20 becomes a smaller value than that in the first lamp waveform. Explain this concretely below.

In the present embodiment, in the lamp waveform for high brightness mode, the current amplitude ratios corresponding to the white, yellow, green, and cyan segments (color filters) with a transmittance of 90% or more for a wavelength of 555 nm are set to a high value, and the current amplitude ratios corresponding to the red, blue, and indigo segments with a transmittance of 5% or less for a wavelength of 555 nm are set to a low value. Furthermore, in the lamp waveform for hue priority mode, the current amplitude ratio corresponding to the white segment is set to a low value, and the current amplitude ratios corresponding to other colors to be brightened are set to a high value. Moreover, in the lamp waveform for low brightness mode, the current amplitude ratios corresponding to the white, yellow, green, and cyan segments with a transmittance of 90% or more for a wavelength of 555 nm are set to a low value, and the current amplitude ratios corresponding to the red, blue, and indigo segments with a transmittance of 5% or less for a wavelength of 555 nm are set to a high value. Incidentally, to protect the lamp, like the blue segment in the lamp waveform for low brightness mode illustrated in FIG. 8, the current amplitude ratio can be changed during a period of irradiation of the segment with a light from the lamp light source 20.

Figure 10:
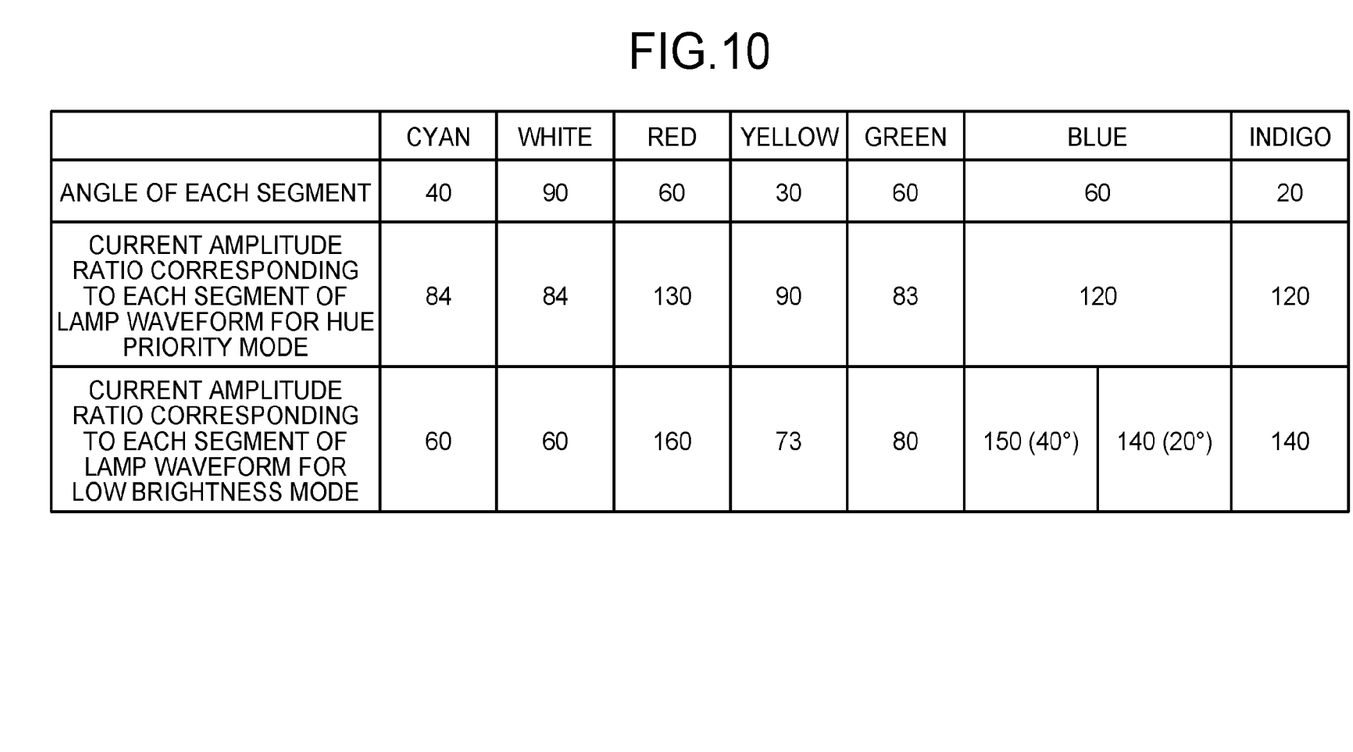
FIG. 10 illustrates an example of the current amplitude ratio corresponding to each segment of the lamp waveform for hue priority mode and the lamp waveform for low brightness mode.

In the following explanation, the lamp waveform for hue priority mode is taken as an example of the first lamp waveform. FIG. 10 illustrates an example of the angle (central angle) of each segment, the current amplitude ratio corresponding to each segment of the lamp waveform for hue priority mode (the first lamp waveform), and the current amplitude ratio corresponding to each segment of the lamp waveform for low brightness mode (the second lamp waveform).

Here, an average current amplitude ratio $A_{ave}$ of an entire segment is defined by the following Equation (1), where $\theta n$ denotes an angle of the nth segment, and An denotes a current amplitude ratio of the nth segment.

$$A_{ave} = \frac{\sum_{i=1}^{n} \theta_n A_n}{\sum_{i=1}^{n} \theta_n} \quad (1)$$

First, focus on the lamp waveform for hue priority mode. In the lamp waveform for hue priority mode, an average current amplitude ratio $A_{ave}$ of the entire segment can be calculated to be "100" by the following Equation (2).

$$A_{ave} = \frac{\sum A_n \theta_n}{\theta_n} = \frac{84 \times 40 + 84 \times 90 + 130 \times 60 + 90 \times 30 + 83 \times 60 + 120 \times 60 + 120 \times 20}{40 + 90 + 60 + 30 + 60 + 60 + 20} = 100 \quad (2)$$

Furthermore, in the lamp waveform for hue priority mode, an average current amplitude ratio $A'_{ave}$ of the white, yellow, green, and cyan segments with a transmittance of 90% or more for a wavelength of 555 nm can be calculated to be "84.5" by the following Equation (3).

$$A'_{ave} = \frac{\sum A_n \theta_n}{\theta_n} = \frac{84 \times 40 + 84 \times 90 + 90 \times 30 + 83 \times 60}{40 + 90 + 30 + 60} = 84.5 \quad (3)$$

Moreover, in the lamp waveform for hue priority mode, an average current amplitude ratio $A''_{ave}$ of the red, blue, and indigo segments with a transmittance of 5% or less for a wavelength of 555 nm can be calculated to be "124" by the following Equation (4).

$$A''_{ave} = \frac{\sum A_n \theta_n}{\theta_n} = \frac{130 \times 60 + 120 \times 60 + 120 \times 20}{60 + 60 + 20} = 124 \quad (4)$$

Next, focus on the lamp waveform for low brightness mode. In the lamp waveform for low brightness mode, an average current amplitude ratio $B'_{ave}$ of the white, yellow, green, and cyan segments with a transmittance of 90% or more for a wavelength of 555 nm can be calculated to be "67.2" by the following Equation (5), and is found to be a smaller value than the value ("84.5" obtained by Equation (3)) in the lamp waveform for hue priority mode. When the average current amplitude ratio of segments with a transmittance of 90% or more for a wavelength of 555 nm is decreased drastically in this way, it can be determined to be a waveform causing a color image to have low brightness.

$$B'_{ave} = \frac{\sum B_n \theta_n}{\theta_n} = \frac{60 \times 40 + 60 \times 90 + 73 \times 30 + 80 \times 60}{40 + 90 + 30 + 60} = 67.2 \quad (5)$$

Furthermore, in the lamp waveform for low brightness mode, an average current amplitude ratio $B''_{ave}$ of the red, blue, and indigo segments with a transmittance of 5% or less for a wavelength of 555 nm can be calculated to be "151" by the following Equation (6), and is found to be a larger value than the value ("124" obtained by Equation (4)) in the lamp waveform for hue priority mode. When the average current amplitude ratio of segments with a transmittance of 5% or less for a wavelength of 555 nm is increased drastically in this way, it can be determined to be a waveform causing a color image to have low brightness.

$$B''_{ave} = \frac{\sum B_n \theta_n}{\theta_n} = \frac{160 \times 60 + 150 \times 40 + 140 \times 40 + 140 \times 20}{60 + 40 + 40 + 20} = 151 \quad (6)$$

Incidentally, the upper and lower limits are set on the current amplitude ratio of a lamp waveform; in the present embodiment, the second lamp waveform is set so that a value of electric power supplied to the lamp light source 20 in a period of irradiation of at least either one of the color filter corresponding to red color and the color filter corresponding to blue color with a light from the lamp light source 20 becomes 90% or more of an allowable maximum value. Furthermore, in the present embodiment, the second lamp waveform is set so that a value of electric power supplied to the lamp light source 20 in a period of irradiation of the color filter corresponding to white color with a light from the lamp light source 20 becomes 110% or less of an allowable minimum value.

Figure 11:
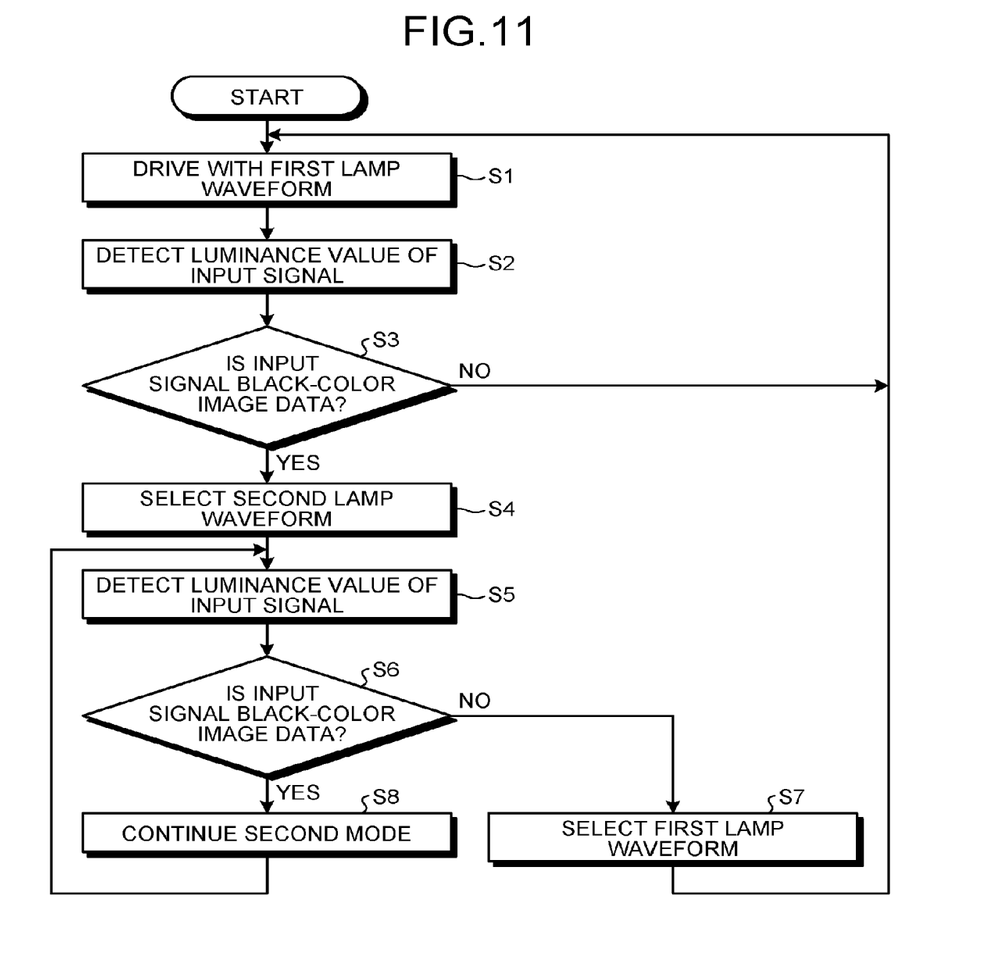
FIG. 11 is a flowchart of an example of the operation of the projector.

Subsequently, an example of the operation of the projector 1 according to the present embodiment is explained with FIG. 11. Step S1 in FIG. 11 is based on the premise that the lamp control unit 11 selects the first lamp waveform (in this example, the lamp waveform for high brightness mode or the lamp waveform for hue priority mode), and controls the electric power supplied to the lamp light source 20 in accordance with the first lamp waveform. That is, it is based on the premise that the lamp light source 20 is driven with the first lamp waveform. Then, each time the input-signal receiving unit 101 of the main control unit 10 receives an input signal, the luminance-value detecting unit 102 detects a luminance value of the received input signal (Step S2). As described above, for example, the luminance-value detecting unit 102 can break the input signal received by the input-signal receiving unit 101 down into multiple sets of different color image data corresponding one-to-one to the multiple color filters included in the color wheel 2 illustrated in FIG. 2 and detect a luminance value with respect to each of pixels included in each of the sets of different color image data.

Then, the selection control unit 103 of the main control unit 10 determines whether the input signal is black-color image data on the basis of a result of the detection at Step S2 (Step S3). For example, when it has been detected at Step S2 that luminance values of all pixels of multiple sets of different color image data which compose the input signal and correspond one-to-one to the multiple color filters included in the color wheel 2 are 0% (provided an allowable maximum luminance value is 100%), the selection control unit 103 can determine that the input signal is image data of full-screen black. When a result at Step S3 is negative (NO at Step S3), the processes at Step S1 onward are repeated. On the other hand, when a result at Step S3 is affirmative (YES at Step S3), the selection control unit 103 performs control of selecting the second lamp waveform (Step S4). As described above, the selection control unit 103 instructs the lamp control unit 11 to select the second lamp waveform. When having received this instruction, the lamp control unit 11 selects the second lamp waveform (switches from the first lamp waveform to the second lamp waveform), and controls the electric power supplied to the lamp light source 20 in accordance with the second lamp waveform. Consequently, the mode of the projector 1 is switched from the first mode in which the lamp light source 20 is driven with the first lamp waveform (in this example, the high brightness mode or the hue priority mode) to the second mode in which the lamp light source 20 is driven with the second lamp waveform (in this example, the low brightness mode).

Incidentally, in this example, when the selection control unit 103 has determined at Step S3 that the input signal received by the input-signal receiving unit 101 is black-color image data, the selection control unit 103 immediately performs control of selecting the second lamp waveform. That is, switching of the lamp waveform is performed by input of only one frame of full-screen black image data; however, if the brightness of a projected image (color image) changes frequently, the flicker phenomenon may be recognized in viewer's eyes. Therefore, the selection control unit 103 can be configured to perform control of selecting the second lamp waveform, for example, when the state where an input signal received by the input-signal receiving unit 101 is black-color image data has continued over a predetermined period (for example, when input signals received continuously over the predetermined number of frames are all black-color image data).

Each time the input-signal receiving unit 101 receives an input signal after Step S4, the luminance-value detecting unit 102 again detects a luminance value of the received input signal (Step S5). Then, the selection control unit 103 determines whether the input signal is black-color image data on the basis of a result of the detection at Step S5 (Step S6). When a result at Step S6 is negative (NO at Step S6), the selection control unit 103 performs control of selecting the first lamp waveform (Step S7). In this example, the selection control unit 103 instructs the lamp control unit 11 to select the first lamp waveform (the lamp waveform for high brightness mode or the lamp waveform for hue priority mode) which had been selected just before the second lamp waveform was selected. The lamp control unit 11 selects the first lamp waveform (switches from the second lamp waveform to the first lamp waveform) in accordance with the instruction from the selection control unit 103, and controls the electric power supplied to the lamp light source 20 in accordance with the selected first lamp waveform. Consequently, the mode of the projector 1 is switched to the first mode again.

On the other hand, when a result at Step S6 is affirmative (YES at Step S6), the selection control unit 103 continues the second mode in which the lamp light source 20 is driven with the second lamp waveform (Step S8), and the processes at Step S5 onward are repeated.

As explained above, in the present embodiment, when an input signal is black-color image data, control of selecting, out of the first lamp waveform indicating temporal change in electric power supplied to the lamp light source 20 in the first mode (in this example, the high brightness mode or the hue priority mode) and the second lamp waveform indicating temporal change in electric power supplied to the lamp light source 20 in the second mode (in this example, the low brightness mode) in which the brightness of a color image is lower than that in the first mode, the second lamp waveform is performed. That is, at the time of full-screen black projection, by switching to a lamp waveform that lowers the brightness of a projected color image, an advantageous effect of improving the contrast of the projector 1 can be achieved.

The embodiment of the present invention is explained above; however, the above-described embodiment is presented as an example and is not intended to limit the scope of the invention. The present invention is not limited to the above embodiment as is, and can be embodied by transforming the components the implementation phase without departing from the scope of the invention. Furthermore, various inventions can be developed by appropriate combinations of multiple components discussed in the above embodiment. For example, some of the components shown in the above embodiment can be eliminated.

Furthermore, a program executed by the projector 1 according to the present embodiment can be provided in such a manner that the program is recorded on a computer-readable storage medium, such as a CD-ROM, a flexible disk (FD), a CD-R, a digital versatile disk (DVD), or a universal serial bus (USB) thumb drive, in an installable or executable file format, or can be provided or distributed via a network such as the Internet. Moreover, various programs can be built into a non-volatile recording medium such as a ROM in advance.

Variations

Variations of the embodiment are described below. Incidentally, the variations described below can be arbitrarily combined with the above embodiment, or some of the variations can be combined arbitrarily.

In the above embodiment, when an input signal is not black-color image data (i.e., when a luminance value of an input signal is 0%), the selection control unit 103 performs control of selecting the second lamp waveform; however, not only that, the selection control unit 103 can be configured to perform control of selecting the second lamp waveform, for example, when a luminance value of an input signal is 5% or less of an allowable maximum luminance value. In short, the selection control unit 103 only has to be configured to perform control of selecting the second lamp waveform when a luminance value of an input signal is equal to or less than the first threshold.

For example, when luminance values indicating respective maximum values in multiple sets of different color image data which compose an input signal and correspond one-to-one to the multiple color filters included in the color wheel 2 are all equal to or less than the first threshold, the selection control unit 103 can perform control of selecting the second lamp waveform.

Furthermore, for example, when luminance values of some image data out of the multiple sets of different color image data which compose the input signal and correspond one-to-one to the multiple color filters are equal to or less than the first threshold, the selection control unit 103 can perform control of selecting the second lamp waveform. For example, when a luminance value of color image data corresponding to a color filter with a transmittance of 90% or more for a wavelength of 555 nm out of the multiple sets of different color image data which compose the input signal and correspond one-to-one to the multiple color filters is equal to or less than the first threshold, the selection control unit 103 can perform control of selecting the second lamp waveform.

Moreover, for example, when an average value of luminance values of the multiple sets of different color image data corresponding one-to-one to the multiple color filters is equal to or less than the first threshold, the selection control unit 103 can perform control of selecting the second lamp waveform.

Furthermore, the detection of a luminance value of an input signal can be targeted at the whole screen, or can be targeted at a part of the screen. For example, with an area other than an area on which image data, such as a menu screen previously prepared on the projector 1 side, is superimposed out of a screen of an input signal as a target, a luminance value can be detected.

Moreover, for example, when the number of pixels of which the luminance value is equal to or less than the first threshold out of multiple pixels included in image data represented by an input signal is equal to or less than a second threshold, the selection control unit 103 can perform control of non-selecting the second lamp waveform.

Furthermore, for example, the selection of the second lamp waveform can be applied immediately after it has been detected that a luminance value of an input signal is equal to or less than the first threshold, or can be applied when this state has continued over a predetermined period. That is, when the state where a luminance value of an input signal is equal to or less than the first threshold has continued over the predetermined period, the selection control unit 103 can perform control of selecting the second lamp waveform.

Moreover, for example, the selection control unit 103 controls the average electrical power of the lamp light source 20 to be variable according to a luminance value of an input signal, and, when the average electrical power of the lamp light source 20 is equal to or less than a third threshold (a value corresponding to the first threshold), the selection control unit 103 can perform control of selecting the second lamp waveform. In so doing, switching of the lamp waveform can be performed when the electrical power of the lamp light source 20 has become stable after the elapse of a certain period of time.

Furthermore, for example, in accordance with the selection of the second lamp waveform, the selection control unit 103 can perform control of switching a gamma characteristic indicating a correspondence relation between a luminance value of an input signal and the brightness of a projected image (color image).

According to an embodiment of the present invention, it is possible to improve the contrast.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus, comprising:
   a light source configured to emit light with a luminance according to electric power supplied to the light source;
   a color wheel configured to sequentially transmit the light from the light source through multiple color filters arranged along a circumferential direction;
   a light modulation element configured to form an image by modulating an intensity of the light transmitted through the color wheel according to an input signal representing input image data; and
   a selection controller configured to select either a first lamp waveform or a second lamp waveform, wherein
   the first lamp waveform indicates a first temporal change in the electric power supplied to the light source in a first mode,
   the second lamp waveform indicates a second temporal change in the electric power supplied to the light source in a second mode,
   the selection controller selects the second lamp waveform when a luminance value of the input signal is equal to or less than a first threshold,
   different current values are set, in each of the first lamp waveform and the second lamp waveform, with respect to periods of irradiation for at least two color filters of the multiple color filters, and a brightness of the image in the second mode is lower than a brightness of the image in the first mode.

2. The image projection apparatus according to claim 1, wherein the selection controller selects the first lamp waveform when the luminance value of the input signal exceeds the first threshold.

3. The image projection apparatus according to claim 1, wherein the first threshold is 5% of an allowable maximum luminance value.

4. The image projection apparatus according to claim 1, wherein the selection controller selects the second lamp waveform when the input signal is black-color image data.

5. The image projection apparatus according to claim 1, wherein the second lamp waveform is set so that a value of the electric power supplied to the light source in a period of irradiation of at least one of a color filter corresponding to a red color and a color filter corresponding to a blue color with the light from the light source becomes larger than a value of the electric power supplied to the light source in a period of irradiation in the first lamp waveform.

6. The image projection apparatus according to claim 1, wherein the second lamp waveform is set so that a value of the electric power supplied to the light source in a period of irradiation of a color filter with a transmittance of 5% or less for a wavelength of 555 nm with the light from the light source becomes larger than a value of the electric power supplied to the light source in a period of irradiation in the first lamp waveform.

7. The image projection apparatus according to claim 1, wherein the second lamp waveform is set so that a value of the electric power supplied to the light source in a period of irradiation of a color filter with a transmittance of 90% or more for a wavelength of 555 nm with the light from the light source becomes smaller than a value of the electric power supplied to the light source in a period of irradiation in the first lamp waveform.

8. The image projection apparatus according to claim 1, wherein the second lamp waveform is set so that a value of the electric power supplied to the light source in a period of irradiation of at least one of a color filter corresponding to a red color and a color filter corresponding to a blue color with the light from the light source becomes 90% or more of an allowable maximum value.

9. The image projection apparatus according to claim 1, wherein the second lamp waveform is set so that a value of the electric power supplied to the light source in a period of irradiation of a color filter corresponding to a white color with the light from the light source becomes 110% or less of an allowable minimum value.

10. The image projection apparatus according to claim 1, wherein the second mode is a mode in which the brightness of the image is at a minimum.

11. The image projection apparatus according to claim 1, further comprising a light-source controller configured to control the electric power supplied to the light source in accordance with a lamp waveform selected by the selection controller.

12. The image projection apparatus according to claim 1, wherein the selection controller selects the second lamp waveform when a luminance value of color image data corresponding to a color filter with a transmittance of 90% or more for a wavelength of 555 nm out of multiple sets of color image data that are represented by the input signal and correspond one-to-one to the multiple color filters is equal to or less than the first threshold.

13. The image projection apparatus according to claim 1, wherein the selection controller does not select the second lamp waveform when the number of pixels each having a luminance value equal to or less than the first threshold out of a plurality of pixels included in image data represented by the input signal is equal to or less than a second threshold.

14. The image projection apparatus according to claim 1, wherein the selection controller selects the second lamp waveform when a state where the luminance value of the input signal is equal to or less than the first threshold has continued over a predetermined period.

15. The image projection apparatus according to claim 1, wherein
the selection controller controls an average electrical power of the light source to be variable according to the luminance value of the input signal, and
the selection controller selects the second lamp waveform when the average electrical power of the light source is equal to or less than a third threshold.

16. The image projection apparatus according to claim 1, wherein the selection controller switches a gamma characteristic indicating a correspondence relation between the luminance value of the input signal and the brightness of the image in accordance with selection of the second lamp waveform.

17. An image projection method implemented by an image projection apparatus that includes a light source configured to emit light with a luminance according to electric power supplied to the light source, a color wheel configured to sequentially transmit the light from the light source through multiple color filters arranged along a circumferential direction, and a light modulation element configured to form an image by modulating an intensity of the light transmitted through the color wheel according to an input signal representing input image data, the method comprising:
selecting either a first lamp waveform or a second lamp waveform; and
setting different current values in each of the first lamp waveform and the second lamp waveform with respect to periods of irradiation for at least two color filters of the multiple color filters, wherein
the first lamp waveform indicates a first temporal change in the electric power supplied to the light source in a first mode,
the second lamp waveform indicates a second temporal change in the electric power supplied to the light source in a second mode,
the second lamp waveform is selected when a luminance value of the input signal is equal to or less than a first threshold, and
a brightness of the image in the second mode is lower than a brightness of the image in the first mode.

18. A non-transitory computer-readable storage medium with an executable program stored thereon and executed by a computer of an image projection apparatus that includes a light source configured to emit light with a luminance according to electric power supplied to the light source, a color wheel configured to sequentially transmit the light from the light source through multiple color filters arranged along a circumferential direction, and a light modulation element configured to form an image by modulating an intensity of the light transmitted through the color wheel according to an input signal representing input image data, wherein the program instructs the computer to perform:
selecting either a first lamp waveform or a second lamp waveform; and setting different current values in each of the first lamp waveform and the second lamp waveform with respect to periods of irradiation for at least two color filters of the multiple color filters, wherein the first lamp waveform indicates a first temporal change in the electric power supplied to the light source in a first mode, the second lamp waveform indicates a second temporal change in the electric power supplied to the light source in a second mode, the second lamp waveform is selected when a luminance value of the input signal is equal to or less than a first threshold, and a brightness of the image in the second mode is lower than a brightness of the image in the first mode.

* * * * *